United States Patent
Al-Nakhli et al.

(10) Patent No.: US 11,578,259 B1
(45) Date of Patent: Feb. 14, 2023

(54) ENERGIZED FRACTURING FLUID BY GENERATION OF NITROGEN GAS

(71) Applicant: Saudi Arabian Oil Company, Dhahran (SA)

(72) Inventors: Ayman R. Al-Nakhli, Dhahran (SA); Wajdi Mohammed Buhaezah, Dammam (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 17/706,116

(22) Filed: Mar. 28, 2022

(51) Int. Cl.
E21B 43/27 (2006.01)
C09K 8/70 (2006.01)

(52) U.S. Cl.
CPC .............. C09K 8/703 (2013.01); E21B 43/27 (2020.05)

(58) Field of Classification Search
CPC ...................................................... E21B 43/27
See application file for complete search history.

(56) References Cited

U.S. PATENT DOCUMENTS

| | | | |
|---|---|---|---|
| 3,980,136 A | 9/1976 | Plummer et al. | |
| 4,454,918 A | 6/1984 | Richardson et al. | |
| 4,846,277 A | 7/1989 | Khalil et al. | |
| 6,858,566 B1 | 2/2005 | Reddy et al. | |
| 7,404,442 B2 | 7/2008 | Dahanayake et al. | |
| 9,695,353 B2 | 7/2017 | Nelson et al. | |
| 10,150,905 B1 | 12/2018 | Reddy | |
| 10,934,468 B2 | 3/2021 | Reddy | |
| 2004/0065396 A1* | 4/2004 | Alilovic | C06B 47/145 149/109.6 |
| 2013/0126169 A1 | 5/2013 | Al-Nakhli et al. | |
| 2018/0244590 A1* | 8/2018 | Beattie | C06B 31/285 |
| 2020/0362679 A1* | 11/2020 | Al-Nakhli | C09K 8/72 |
| 2021/0179928 A1* | 6/2021 | Al-Nakhli | E21B 43/129 |

FOREIGN PATENT DOCUMENTS

| | | |
|---|---|---|
| CN | 101323780 | 12/2008 |
| WO | WO 2015161205 | 10/2015 |

* cited by examiner

Primary Examiner — Silvana C Runyan
(74) Attorney, Agent, or Firm — Fish & Richardson P.C.

(57) ABSTRACT

A system and method of hydraulic fracturing, including providing a fracturing fluid having a nitrite-containing compound through a wellbore into a subterranean formation to hydraulically fracture the subterranean formation, thereby forming fractures in the subterranean formation. The technique includes generating nitrogen gas (and thus foam) in the fractures via the nitrite-containing compound, and in which generating the nitrogen gas facilitates flowback.

13 Claims, 7 Drawing Sheets

ENERGIZED FRACTURING FLUID BY GENERATION OF NITROGEN GAS

TECHNICAL FIELD

This disclosure relates to hydraulic fracturing and flowback of fracturing fluid.

BACKGROUND

Hydraulic fracturing employs fluid and material to generate fractures in a subterranean formation to stimulate production from oil and gas wells. Hydraulic fracturing is a well-stimulation technique in which rock is fractured by a pressurized fluid that may be a fracturing fluid. The process can involve the pressure injection of fracturing fluid into a wellbore to generate cracks in the deep-rock formations through which natural gas, petroleum, and brine will flow more freely. The fracturing typically generates paths that increase the rate at which production fluids, such as crude oil or natural gas, can be produced from the reservoir formations. The amount of increased production may be related to the amount of fracturing. Proppant may be employed to maintain the fractures as pressure depletes in the well during hydrocarbon production. The proppant may resist formation closure stresses to keep fractures open. Hydraulic fracturing may allow for the recovery of crude oil and natural gas from unconventional formations that geologists once believed were impossible to produce.

SUMMARY

An aspect relates to a method of hydraulic fracturing, including providing a fracturing fluid having a nitrite-containing compound through a wellbore into a subterranean formation to hydraulically fracture the subterranean formation, thereby forming hydraulic fractures in the subterranean formation. The method includes generating nitrogen gas in the hydraulic fractures via the nitrite-containing compound, and generating foam in the hydraulic fractures from the nitrogen gas and the fracturing fluid. The method includes performing flowback of the fracturing fluid from the hydraulic fractures through the wellbore to Earth surface, wherein generating the nitrogen facilitates the flowback.

Another aspect is a method of hydraulic fracturing, including injecting a fracturing fluid having a nitrite-containing compound through a wellbore into a subterranean formation, wherein the nitrite-containing compound is not encapsulated. The method includes hydraulically fracturing the subterranean formation with the fracturing fluid to generate fractures in the subterranean formation. The method includes generating nitrogen gas via the nitrite-containing compound in the fractures, wherein the nitrogen gas foams the fracturing fluid, wherein the nitrogen gas foaming the fracturing fluid advances flowback of the fracturing fluid from the fractures through the wellbore to Earth surface.

Yet another aspect is a method of hydraulic fracturing, including pumping a fracturing fluid having a nitrite-containing compound through a wellbore into a subterranean formation, thereby hydraulically fracturing the subterranean formation via the fracturing fluid and generating hydraulic fractures in the subterranean formation. The method includes forming nitrogen gas via the nitrite-containing compound in the fracturing fluid in the hydraulic fracture, thereby energizing the fracturing fluid with the nitrogen gas to give the fracturing fluid as an energized fracturing fluid to promote flowback. The method includes allowing the flowback of the energized fracturing fluid from the hydraulic fractures through the wellbore to Earth surface.

The details of one or more implementations are set forth in the accompanying drawings and the description below. Other features and advantages will be apparent from the description and drawings, and from the claims.

DETAILED DESCRIPTION

Some aspects of the present disclosure are directed to promoting flowback of fracturing fluid by including a nitrogen-generating compound in the formulation of the fracturing fluid (e.g., a relatively high-viscosity fracturing fluid) to generate nitrogen gas in-situ. The fracturing fluid (also known as frac fluid) may have a relatively high viscosity. The nitrogen-generating compound may be, for example, sodium nitrite or ammonium chloride, or both. The nitrogen-generating compound may be activated by heat or acid, or both. Advantageously, providing for the nitrogen gas forming in situ (at the fracturing) instead of incorporating the nitrogen gas into the fracturing fluid at surface (Earth surface adjacent or near the wellbore) may allow for higher hydrostatic pressure in the pumping of the fracturing fluid downhole.

Hydraulic fracturing of hydrocarbon reservoirs (e.g., natural gas reservoirs) in a subterranean formation is a common stimulation technique to increase production of the hydrocarbon (e.g., natural gas, etc.). A challenge during fracturing low-pressure reservoirs may be long flowback time to recover fracturing fluid. Fracturing fluids commonly contain polymers (e.g., guar) to create high viscosity to carry proppant. Such viscous fluids may be difficult to flowback (e.g., low flowback rate, long time of flowback, etc.), especially when pressure of the reservoir (that provides motive force for flowback) is relatively low.

To address this challenge, embodiments herein provide for fracturing fluid that is in-situ energized to promote flowback of the fracturing fluid. Incorporating a gas (e.g., air, nitrogen, carbon dioxide, or a combination) into a liquid can be characterized as energizing the liquid to give an energized fluid. Here, a nitrogen-generating compound, such as sodium nitrite and/or ammonium chloride, may be incorporated with fracturing fluid to generate nitrogen in-situ, which may energize the fracturing fluid in-situ (giving associated in-situ foam) and thus provide lifting energy to accelerate well flowback. In contrast, energizing or foaming the fracturing fluid via addition of gas at the Earth surface ("the surface") gives lower hydrostatic pressure of the fracturing fluid as pumped from the Earth surface through the wellbore, which can adversely affect the squeeze of the fracturing fluid into the formation. Advantageously, embodiments of the present techniques provide for in-situ energizing of the fracturing fluid (in-situ foamed fracturing fluid) without requiring energizing or foaming at Earth surface. Therefore, the hydrostatic pressure of the pumped fracturing fluid as flowing down through the wellbore is greater and can give a practical squeeze, as well as requiring less mixing facility on surface (e.g., not requiring mixing equipment for energizing the fracturing fluid at the Earth surface).

Energized fluids are defined as fluids that include liquid with a compressible gas component(s), such as air, nitrogen, and/or carbon dioxide, dispersed in the liquid. In implementations, energized fluids may offer an attractive alternative to conventional stimulation fluids in certain cases, such as with low reservoir pressure, need for shorten flowback period, and so on. There may be a desire to foam or energize the treatment fluid (e.g., fracturing fluid) using a gas, such as air, nitrogen, carbon dioxide, or any combination thereof. The treatment fluid (fracturing fluid) may further include a foaming agent to increase tendency of the treatment fluid to foam. A foaming agent (e.g., a surfactant) is typically present in relatively small amounts in the fluid and facilitates formation of a foam, and/or enhances foam stability by inhibiting the coalescence of bubbles.

Hydraulic fracturing fluids containing proppant are employed to enhance productivity from hydrocarbon reservoir formations, including carbonate formations, sandstone formations, shale formations, and the like. During hydraulic fracturing operations, a fracturing fluid is pumped under a pressure and rate sufficient to fracture (crack, fragment, etc.) the reservoir (formation) rock to create fractures in the rock.

Hydraulic fracturing operations may include stages, such as a pad stage, a proppant fluid stage, an overflush fluid stage, and the like. The three stages may make use of highly viscous and/or gelled fluids. The pad fluid stage typically involves pumping a pad fluid into the formation. The pad fluid may generally be a viscous gelled fluid utilized to initiate and propagate the fractures. The pad fluid may more generally be a fracturing fluid or a version of a fracturing fluid. The term fracturing fluid as used herein may include pad fluid. The fracturing fluid free of proppant may be pad fluid.

The fracturing fluid having proppant may be a slurry conveying the proppant into the fractures. This slurry may generate fractures. The proppant stage may involve pumping a slurry containing proppant into the fractures of the formation. The proppant fluid (fracturing fluid having proppant) contains the proppant in fracturing fluid that can be a viscous gelled fluid or a viscoelastic surfactant fluid. The proppant, as conveyed, lodges in the fractures and supports a conductive fracture network through which hydrocarbons flow during subsequent production of hydrocarbons after the hydraulic fracturing operation. A later or final state of the hydraulic fracturing operation may be the overflush stage, which can include pumping a viscous gelled fluid into the fractures to promote that the proppant are pushed inside the fractures.

A downside of these stages is that a volume (e.g., a relatively high volume) of gelled or polymeric materials can be left behind in the fractures. Moreover, in low-pressure reservoirs, flowback time of the flowback (in general cleanup of the treated well) can take up to weeks. In some instances, operators may be forced to apply gas lifting (e.g., nitrogen lifting) to the well to aid the flowback.

In response, embodiments herein may provide for a self-energized fracturing fluid in a sense that the fracturing fluid includes a nitrogen-generating component(s) or compound(s) that generates nitrogen in-situ in response to an activator, such as formation heat (downhole temperature) and/or chemical activator (e.g., acid). Nitrogen-generating compounds, such as sodium nitrite or ammonium chloride, may be incorporated in the fracturing fluid. The chemical activator (if employed) may be included in the fracturing fluid or fed downhole in a post-flush. Foaming agents and foam stabilizers may be added to the fracturing fluid. Upon injecting the fracturing fluid into the formation, these compounds will be activated by either downhole temperature, or an added activator. In implementations (e.g., at pH of the fracturing fluid less than 11), the reaction of the nitrite-containing compound or the reaction of thermochemical reaction may be initially activated at a temperature, for example, in a range of 120° F. to 375 F, or in the range of 120° F. to 200° F. Such may be a function of pressure (see, e.g., FIG. 3). As discussed below, the reaction triggering temperature may be a function of the pH of the fracturing fluid. When the reactant(s) [nitrogen-generating compound(s)] is activated, foam of nitrogen gas with fracturing fluid may be generated in-situ.

Foam generated downhole may provide for a practical technique to fracture and squeeze foam into the subterranean formation, including from an operational point of view. Hydrostatic pressure of the liquid column of fracturing fluid liquid (as opposed to a foam column of fracturing fluid) in the wellbore may provide extra pressure to hydraulic forces, which may aid in the pumped fracturing (the forming of fractures). However, when foam is generated on surface, as in traditional energized fracturing fluids, hydrostatic pressure will be low and pumping issues may be encountered to fracture reservoirs.

Figure 1:
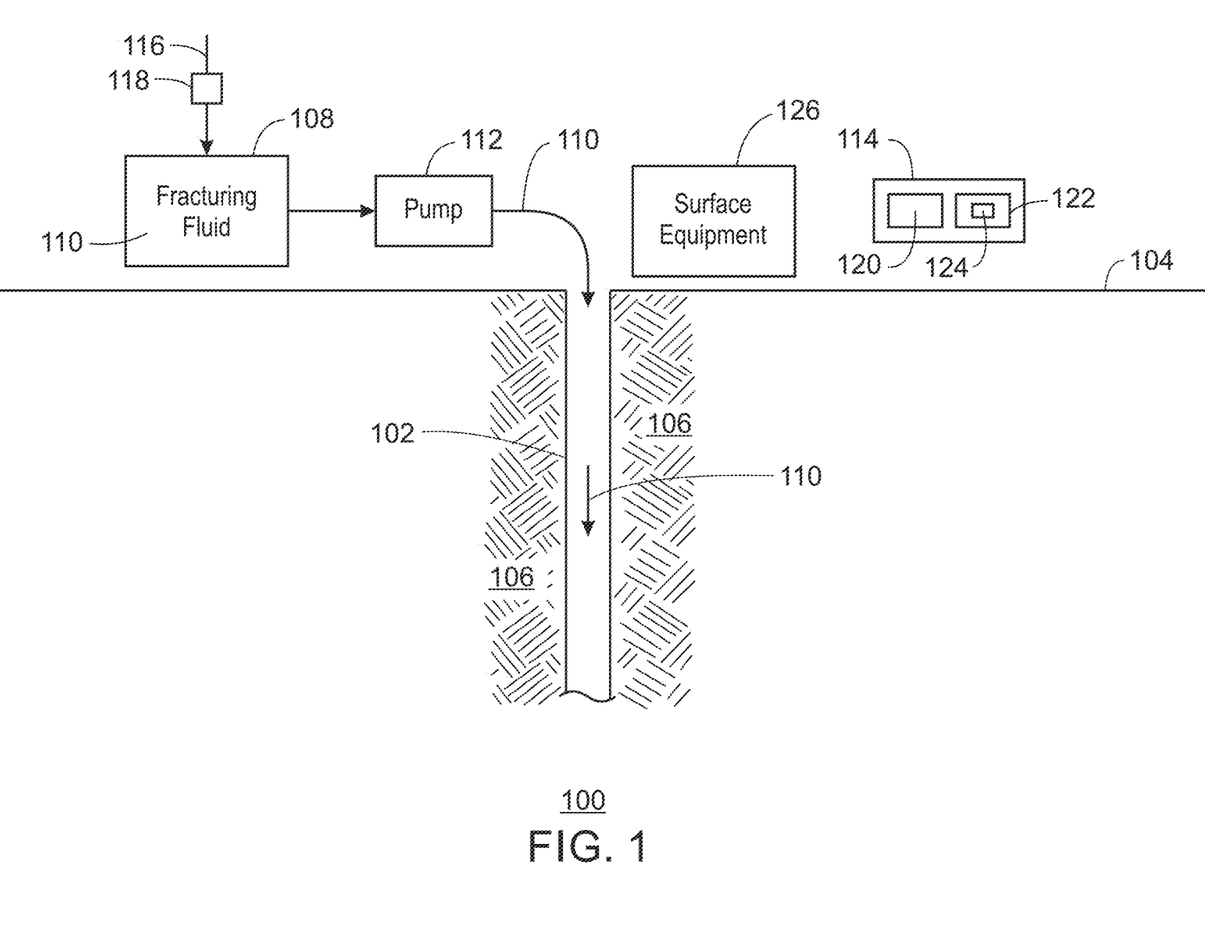
FIG. 1 is a diagram of a well site having a wellbore formed through the Earth surface into a subterranean formation in the Earth crust.

FIG. 1 is a well site 100 having a wellbore 102 formed through the Earth surface 104 into a subterranean formation 106 in the Earth crust. The subterranean formation 106 may be labeled as a geological formation, a rock formation having hydrocarbon, a hydrocarbon formation, a formation reservoir, a hydrocarbon reservoir, a natural gas reservoir, a reservoir, and the like. The subterranean formation 106 may be an unconventional formation to be subjected to hydraulic fracturing.

The wellbore 102 can be vertical, horizontal, or deviated. The wellbore 102 can be openhole but is generally a cased wellbore. The annulus between the casing and the formation 106 may be cemented. Perforations may be formed through the casing and cement into the formation 106. The perforations may allow both for flow of fracturing fluid into the subterranean formation 106 and for flow of flowback and produced hydrocarbon from the subterranean formation 106 into the wellbore 102.

The well site 100 may have a hydraulic fracturing system including a source 108 of fracturing fluid 110 at the Earth surface 104 near or adjacent the wellbore 102. The source 108 may include one or more vessels holding the fracturing fluid 110. The fracturing fluid 110 may be stored in vessels or containers on ground, on a vehicle (for example, truck or trailer), or skid-mounted. The fracturing fluid 110 may be a water-based fracturing fluid. In some implementations, the fracturing fluid 110 is slickwater that may be primarily water (for example, at least 98.5% water by volume). The fracturing fluid 110 can be prepared from seawater. The fracturing fluid 110 can be gel-based fluids. The fracturing fluid 110 can include polymers and surfactants. Other additives to the fracturing fluid 110 may include friction reducer, surfactant(s), foaming agent, emulsion breaker, emulsifier, temperature stabilizer, crosslinker, acid, and so forth. Fracturing fluids 110 of differing viscosity may be employed in the hydraulic fracturing. The fracturing fluid 110 may include proppant. In the illustrated embodiment, the fracturing fluid 110 includes at least one nitrogen-generating compound. In operation, the fracturing fluid 110 is provided to (introduce into) the wellbore 102. The fracturing fluid 110 may be injected (pumped) into the wellbore 102.

The hydraulic fracturing system at the well site 100 may include motive devices such as one or more pumps 112 to pump (inject) the fracturing fluid 110 through the wellbore 102 into the subterranean formation 106. The pumps 112 may be, for example, positive displacement pumps and arranged in series or parallel. Again, the wellbore 102 may be a cemented cased wellbore and have perforations for the fracturing fluid 110 to flow (e.g., via motive force of the pumps 110) into the formation 106. In some implementations, the speed of the pumps 110 may be controlled to give desired flow rate of the fracturing fluid 110. The system may include a control component to modulate or maintain the flow of fracturing fluid 110 into the wellbore 102 for the hydraulic fracturing. The control component may be, for example, a control valve(s). In some implementations, as indicated, the control component may be the pump(s) 112 as a metering pump in which speed of the pump 112 is controlled to give the desired or specified flow rate of the fracturing fluid 110. The set point of the control component may be manually set or driven by a control system, such as the control system 114. The flow rate of the fracturing fluid 110 may include a clean rate that is flow rate of fracturing fluid 110 without proppant. The flow rate of the fracturing fluid 110 may include a slurry rate that may be a flow rate of the fracturing fluid 110 (e.g., a thicker or more viscous fracing fluid) as a slurry having proppant, and the like.

The fracturing fluid 110 may be prepared (formulated and mixed) offsite prior to disposition of the fracturing fluid 110 into the source 108 (e.g., vessel(s) at the well site 100. Alternatively, a portion (some components) of the fracturing fluid 110 may be mixed offsite and disposed into the source 108 vessel and the remaining portion (remaining components) of the fracturing fluid 110 added to the source 108 vessel or to a conduit conveying the fracturing fluid 110. In other implementations, the fracturing fluid 108 may be prepared onsite with components added to (and batch mixed in) the source 108 vessel.

For embodiments of the fracturing fluid 110 including one or more nitrogen-generating compounds, the fracturing fluid 110 in the source 108 vessel may have all components of the fracturing fluid 110. In certain embodiments, some components of the fracturing fluid 110 may be added to the source 108 vessel near or at the time (or during) the pumping of the fracturing fluid 110 into the wellbore 102 for the hydraulic fracturing. However, in other embodiments, not all components of the fracturing fluid 110 are included in the source 108 vessel. Instead, at least one component of the fracturing fluid 110 may be added to the conduit conveying the fracturing fluid 110 either to a suction conduit of the pump 112 or a discharge conduit of the pump 112, or both, as the fracturing fluid 110 is being pumped into the wellbore 102. Such can be characterized as on-the-fly addition of the component.

An additive or component 116 may be added to the fracturing fluid 108. The component 116 may be, for example, the nitrogen-generating compound(s). The concentration of the component 116 (for example, nitrogen-generating compound or nitrogen-generating compounds) in the fracturing fluid 110 may be maintained or altered (adjusted) by adjusting (modulating) a flow rate (mass or volume) of addition of the component 116 via a control device 118. The set point of the control device 118 may be manually set or specified (directed) by the control system 114. The control device 118 may be a control valve on the conduit conveying component 116 to the source 108 (for example, vessel) of the fracturing fluid 110. For the component 116 as a nitrogen-generating compound(s), the addition rate of the component 116 may be adjusted to alter the amount or concentration (e.g., weight percent, volume percent, gpt, etc.) of the component 116 in the fracturing fluid in response to operational feedback from the hydraulic fracturing operation. For instance, the addition rate of the nitrogen-generating compound may be altered in response to measured wellbore pressure as indicated to the control system 114. The addition rate of the nitrogen-generating compound may be reduced to decrease wellbore pressure as indicated, for example, by a pressure sensor in the wellbore or at the wellhead. In implementations, the addition rate of the nitrogen-generating compound may be increased to increase the wellbore pressure or the amount foaming in the hydraulic fractures.

For the component 116 as a nitrogen-generating compound(s), the nitrogen-generating compound may be added as a liquid. The nitrogen-generating compound may be added as a solid (powder), for example, via the control device 118 as a rotary feeder valve. Alternatively, the nitrogen-generating compound(s) may in added in an aqueous solution or dispersion to the fracturing fluid 110 in the source 108 vessel. Moreover, instead of adding the component 116 to the source 108 vessel, the component 116 may be added to the discharge conduit of the pump 112 as the pump 112 is providing the fracturing fluid 110 into the wellbore 102.

Further, in implementations, the nitrogen-generating compound(s) is not added as the component 116 but instead is incorporated in the formulation (e.g., initial formulation) prior to pumping the fracturing fluid 110 into the wellbore 102.

The hydraulic fracturing system at the well site 100 may have a source of proppant, which can include railcars, hoppers, containers, or bins having the proppant. Proppant may be segregated by type or mesh size (particle size). The proppant can be, for example, sand or ceramic proppants. The source of proppant may be at the Earth surface 104 near or adjacent the wellbore 102. The proppant may be added to the fracturing fluid 110 such that the fracturing fluid 110 includes the proppant. In some implementations, the proppant may be added (for example, via gravity) to a conduit conveying the frac fluid 110, such as at a suction of a fracturing fluid pump 112. A feeder or blender may receive proppant from the proppant source and discharge the proppant into pump 112 suction conduit conveying the fracturing fluid 110.

The fracturing fluid 110 may be a slurry having the solid proppant. The pump 112 discharge flow rates (frac rates) may include a slurry rate which may be a flow rate of the fracturing fluid 110 as slurry having proppant. The pump 112 discharge flow rates (frac rates) may include a clean rate which is a flow rate of fracturing fluid 910 without proppant. In particular implementations, the fracturing system parameters adjusted may include at least pump(s) 112 rate, proppant concentration in the frac fluid 110, component 116 addition rate, and component 116 concentration in the fracturing fluid 110. Fracturing operations can be manual or guided with controllers.

The fracturing fluid 110 may be a self-energizing fracturing fluid in a sense that the fracturing fluid 110 includes nitrogen-generating compound(s) activated by formation 106 temperature and/or a chemical activator to generate nitrogen in-situ to energize the fracturing fluid 110. The fracturing fluid 110 may provide for beneficial hydraulic fracturing, as well as provide via activation the in-situ generation of nitrogen gas and associated foam. An advantage is that generating foam downhole can promote faster flowback of the well. Moreover, in-situ generation of foam can be more straightforward and practical (less costly) than forming foam at the surface 104 by mixing gas with the fracturing fluid 110. Surface mixing of foam in the fracturing fluid 110 prior to introduction to the wellbore 102 is not only generally complex operationally, but also can result in pump 112 (or different pump) failure as may be difficult to squeeze foam into the formation 106 from the surface 104. The pumped squeeze may be a challenge due to low hydrostatic pressure of the foam (as compared to non-foamed fracturing fluid) flowing downward through the wellbore 102. In contrast, with implementations of the present fracturing fluid 110, the fracturing fluid 110 may generally be liquid with little or no foam and thus provide the benefit (for the pump or squeeze) of greater hydrostatic pressure than if the fracturing fluid was foamed at surface 104.

As discussed, the fracturing fluid 110 includes a nitrogen-generating compound, which may be a nitrite-containing compound or an ammonium-containing compound, or both. The nitrite-containing compound can be, for example, sodium nitrite or potassium nitrite, or both. In implementations, the nitrite-containing compound (without presence of the ammonium-containing compound) generates the nitrogen ($N_2$) gas via decomposition or dissociation of the nitrite-containing compound due to temperature of the subterranean formation and/or due to acid as an activator. This generation of nitrogen gas via sodium nitrite without presence of an ammonium-containing compound was confirmed in the Example below.

The ammonium-containing compound can be, for example, ammonium hydroxide, ammonium chloride, ammonium bromide, ammonium nitrate, ammonium nitrite, ammonium sulfate, ammonium carbonate, or ammonium hydroxide, or any combinations thereof. The ammonium-containing compound can react with the nitrite-containing compound to generate nitrogen gas. The ammonium-containing compound provides ammonium ions and the nitrite-containing compounds provide nitrite ions. In this context for implementations, the ammonium-containing compound and the nitrite-containing compound can be called thermochemical reagents and the reaction labeled as a thermochemical reaction. For the specific implementation of the ammonium-containing compound as ammonium chloride ($NH_4Cl$) and the nitrite-containing compound as sodium nitrite ($NaNO_2$), the reaction can be as follows that generates $N_2$, water ($H_2O$), and sodium chloride (NaCl):

$$NH_4Cl + NaNO_2 \xrightarrow{(H+ or \Delta H)} N_2(g) + NaCl + 2H_2O + Heat(75 Kcal/mol)$$

In this thermochemical reaction (an exothermic reaction) depicted immediately above, sodium chloride (NaCl), water ($H_2O$), and heat are generated in addition to the generated $N_2$. The heat generated may be, for example, 75 kilocalories per mol (Kcal/mol). The thermochemical reaction can be activated by heat ($\Delta H$) and/or a hydrogen ion (H+) such as from an acid. While the thermochemical reaction may experience an enthalpy change, the symbol $\Delta H$ here represents the addition of heat, such as at temperatures greater than 120° F. The chemical activator may be a compound (e.g., acid) capable of releasing an acidic hydrogen.

Heat provided by the formation 106 may activate this reaction. The ammonium-containing compound (e.g., ammonium chloride) and nitrite-containing compound (e.g., sodium nitrite) may react at formation temperature without an acid activator. In implementations, the pH of the fracturing fluid may influence the reaction triggering (activation) temperature. See, e.g., FIG. 4. In some examples at pH above 11, the formation temperature (heat) is generally inadequate to activate the reaction. Therefore, an acid activator may be injected. In implementations, acids that can be used as an activator (chemical activator) for the reaction (e.g., a thermochemical reaction) of the nitrite-containing compound with the ammonium-containing compound (e.g., as thermochemical reagents) to generate nitrogen gas include weak acids (e.g., acetic acid, citric acid, etc.) and strong acids (hydrochloric acid, etc.). The strong acids when added to (or otherwise incorporated) into the fracturing fluid can be concentrated or diluted. In general, a compound capable of releasing an acidic hydrogen can be utilized as the chemical activator in implementations. Moreover, reservoir temperature (temperature of the subterranean formation) may be adequate to activate the thermochemical reaction without a chemical activator.

Figure 4:
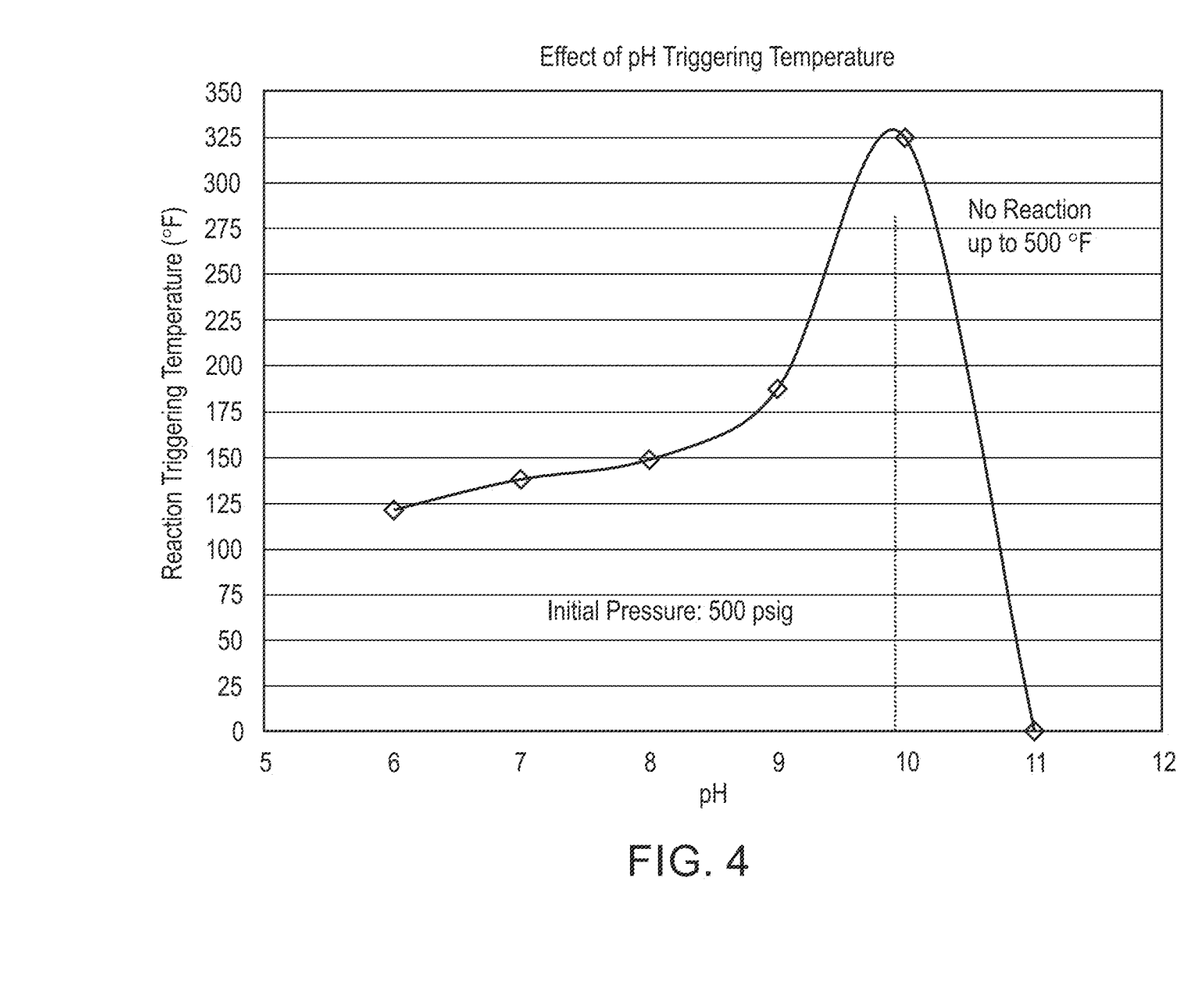
FIG. 4 is a plot of the triggering (activating) temperature of reaction of sodium nitrite in fracturing fluid to generate nitrogen gas versus pH of the fracturing fluid for an implementation.

Further, in implementations, the ammonium-containing compound (e.g., ammonium chloride) and the nitrite-containing compound (e.g., sodium nitrite) may generally not react in the fracturing fluid at surface 104. Also, in embodiments, little or none of this reaction may occur while the fracturing fluid is traveling downhole through the wellbore 102 to the fractures. In instances, the temperature of the fluid may be below the triggering temperature of the reaction. The reaction (e.g., thermochemical reaction) activation may be a function of temperature, pressure, and pH. The pH of the fracturing fluid can be increased, for example, by including and adjusting the amount hydroxide-containing compounds (e.g., sodium hydroxide) in the fracturing fluid, to adjust reaction activation temperature in view of the wellbore 102 and reservoir 106 temperature. In certain embodiments, the pH of the fracturing fluid may be increased to at least 11 (e.g., in the range of 11 to 13, or 11 to 12.5), so the reaction will generally not take place, as indicated in the example of FIG. 4, without a chemical activator. An activator can be injected as a post-flush to reduce the pH and trigger the reaction. When implemented, a post-flush with acidic fluid may include organic acid (e.g. acetic acid, etc.) or inorganic acid (e.g., hydrochloric acid, citric acid, etc.). Lastly, a nitrite-containing compound(s) can be employed as a standalone reactant without ammonium ions or acid to generate $N_2$ gas, as discussed.

The example components and their example concentrations are given for the present fracturing fluid (e.g., fracturing fluid 110). In implementations, the fracturing fluid is predominantly (primarily) water. In implementations, the fracturing fluid (e.g., a wet basis or not counting proppant) may be, for example, at least 90 volume percent (vol %) of water or at least 90 weight percent (wt %) of water. The fracturing fluid may include polymer stabilizers, clay stabilizers, corrosion inhibitors, nanomaterial (e.g., silica nanoparticles) to improve foam stability, scavengers (e.g., oxygen scavenger), and so forth.

The unit of molar given below is molar concentration in moles of the component per liters of the fracturing fluid. The concentration of the nitrite-containing compound (e.g., sodium nitrite) in the fracturing fluid can be, for example, less than 15 molar, or in the range of 0.5 molar to 10 molar (or 1 molar to 9 molar). The concentration of the ammonium-containing compound (if included) in the fracturing fluid can be, for example, less than 12 molar, or in the range of 0.5 molar to 8 molar (or 1 molar to 6 molar). The concentration of polymer (if included) or guar (if included) in the fracturing fluid to viscosity (increase viscosity of) the fracturing fluid may be, for example, in the range of 0.5 gallons per thousand gallons (gpt) to 7 gpt, or in the range of 1 gpt to 5 gpt. The guar may be a guar-based gelling agent. The guar may be, for example, hydroxypropyl guar or carboxymethyl guar. Certain implementations of the fracturing fluid do not include such a polymer or guar. The in-situ foamed fracturing fluid may have adequate viscosity to carry out proppant without need for polymer or guar. In certain implementations, the fracturing fluid includes at least one of the polymer or the guar, but not both.

The fracturing fluid may include a surfactant(s) in a range of 0.1 gpt to 4 gpt to reduce friction of flow of the fracturing fluid. Surfactant(s) may also act to promote generation and/or stabilization of foam. The fracturing fluid may include a gel stabilizer in a range of 0.1 gpt to 4 gpt. The gel stabilizer can include alkaline metal oxides, alkaline metal hydroxides, alkaline earth metal oxides, alkaline earth metal hydroxides, transition metal oxides, transition metal hydroxides, glycols, or polyols, or any combinations thereof. The gel stabilizer can be an organic gel stabilizer. In function, the gel stabilizer can be a viscosity stabilizer that stabilizes viscosity of the fracturing fluid. The presence of the gel stabilizer in the fracturing fluid may reduce the rate of viscosity loss of the fracturing fluid during the treatment, which can result in more efficient proppant transport in implementations. The fracturing fluid may include an organic crosslinker or an inorganic crosslinker, for example, in the range of 0.5 gpt to 4 gpt, such as for crosslinking polymer in the fracturing fluid. The fracturing fluid may include a gel breaker, for example, in the range of 0.5 gpt to 6 gpt.

The fracturing fluid includes a foaming agent(s), for example, in the range of 1 gpt to 60 gpt to promote formation of the foam or to promote stability of the foam, or a combination thereof. A foaming agent is a material (e.g., surfactant) that facilitates the formation (and sometimes stability) of foam. When present (e.g., in relatively small amounts) the foaming agent may reduce surface tension of a liquid (reduces the work needed to create the foam) and/or be a foam stabilizer that may increase the foam colloidal stability by inhibiting coalescence of bubbles. The foaming agent (which may be a foamer or a foam stablizer) may be a surfactant, such as a betaine (for example, hydroxysulfobetaine) or a hydroxysultaine (for example, cocamidopropyl hydroxysultaine). In certain contexts, distinctions may be made between foaming agent versus foam stabilizer in that a foaming agent (foamer) may be characterized as compounds that facilitate or promote generation of foam and a foam stabilizer may be characterized as compounds that facilitate or promote stability (not collapsing) of the foam after generation of the foam. In these contexts, foaming agents can be, for example, surfactants and fatty acid, and foam stabilizer can be organic or inorganic compounds, and nanomaterials. However, in other instances, the foaming agent may be characterized as generally synonymous with foam stabilizer. A foaming compound that advances foam may be a foaming agent and/or a foam stabilizer.

In addition to the hydraulic fracturing system, the well site 100 may include additional surface equipment 126. The surface equipment 126 may support the hydraulic fracturing system. The surface equipment 126 may provide for general operations at the well site 100. The surface equipment 126 may include a wellhead to support the production of fluid from the subterranean formation 106. A wellhead may be a component or structure at the Earth surface 104 coupled to (or in communication with) the wellbore 102 and that provides the structural and pressure-containing interface for drilling and production equipment. The wellhead generally includes conduits (piping, tubing, etc.) and valves for receiving, routing, and discharge of fluid (e.g., hydrocarbon, water, flowback, etc.) produced from the formation 106.

After performing the hydraulic fracturing, the fracturing fluid 110 downhole as energized (foamed) via the in-situ generated nitrogen gas may be allowed to flowback from the formation 106 through the wellbore 102 to the surface 104. As mentioned, a foaming agent in the fracturing fluid 110 may promote the forming (via the nitrogen) and/or stability of the formed foam. Motive force for the flowback can be the pressure of the subterranean formation 106, such as wellbore 102 bottomhole pressure or an intermediate position, such as at depth of a top portion of the perforations.

Motive force for the flowback can be wellbore 102 pressure generated (increased) by the energizing of the fracturing fluid 110 with the in-situ generated nitrogen gas. In implementations, motive force for the flowback can be the in-situ generated nitrogen gas decreasing hydrostatic pressure of upward flowing fracturing fluid 110 in the wellbore 102.

Aspects of this well lifting via the in-situ formed nitrogen gas may be analogous to well lifting generally that utilizes natural gas. The energizing of the fracturing fluid may give "lifting energy," which may mean the fracturing fluid has less hydrostatic head (pressure) due to the nitrogen generation and thus easier for formation pressure to displace as flowback to the surface.

Again, formation pressure may be motive force for flowback. The nitrogen gas may reduce the weight of the fracturing fluid being displaced by the formation pressure to the surface. Further, the reaction to give nitrogen gas can generate pressure (increases downhole pressure) that add to the formation pressure. The reaction of the nitrogen-generating compound(s) to form nitrogen gas can generate up to an additional 20,000 pounds per square inch (psi), as measured in the laboratory. Also, a pressure increase of 800 psi due to the reaction was observed during a field application, as indicated by wellhead pressure.

In general, flowback may refer to the fluid returned to the surface from the subterranean formation, or to the process of allowing the fluid to return to the surface from the subterranean formation. Flowback may be the process of allowing fluids to flow from the well following a treatment, either in preparation for a subsequent phase of treatment or in preparation for cleanup and returning the well to production. Flowback may be the fluid returning to the surface after being injected into a subterranean formation.

Here, the flowback of the fracturing fluid 110 (e.g., as energized via the in-situ formed nitrogen gas) may discharge from the wellbore 102 through the wellhead, such as through a production valve of the wellhead. In implementations, the flowback may be routed through the production valve into a sales line. The routing of the flowback flow from the wellbore 102 may via an automated production valve (and manual valves) on the wellhead. The fracturing fluid 110 returned to the surface 104 may be labeled as flowback.

Some aspects of the present disclosure are not necessarily directed to creating fractures by the generation of in-situ nitrogen gas, but instead to energizing the fracturing fluid downhole to accelerate fracturing fluid flowback from the reservoir. This may reduce or eliminate the damage caused by the fracturing fluid and accelerate fracture cleanup. Moreover, the nitrogen-generating compound(s) is generally not encapsulated. In implementations, the reaction to generate in-situ nitrogen gas may be activated by reservoir temperature (or pressure), or by pumping a post-flush of acid (e.g., acetic acid, etc.). Therefore, in implementations, encapsulation (e.g., to delay the reaction) is typically not needed. In addition, the fracturing fluid may be a relatively viscous fracturing fluid. Alternatively, the fracturing fluid may be, for example, slickwater fracturing fluid, or fracturing fluid that is not viscous. Also, the present fracturing fluid may have the nitrogen-generating compound(s) as a thermochemical additive(s). These thermochemical additives may be incorporated within the fracturing fluid and activated inside the reservoir (e.g., activated via reservoir temperature, including post fracturing). Upon activation, nitrogen gas (and thus foam) may be generated in the reservoir and downhole to energize the fracturing fluid and thus facilitate removal of the fracturing fluid from the reservoir (subterranean formation).

The well site 100 may include the control system 114 that supports or is a component of the hydraulic fracturing system. The control system 114 includes a processor 120 and memory 122 storing code 124 (logic, instructions) executed by the processor 120 to perform calculations and direct operations at the well site 900. The processor 120 may be one or more processors and each processor may have one or more cores. The hardware processor(s) 120 may include a microprocessor, a central processing unit (CPU), a graphic processing unit (GPU), a controller card, or other circuitry. The memory may include volatile memory (for example, cache and random access memory (RAM)), nonvolatile memory (for example, hard drive, solid-state drive, and read-only memory (ROM)), and firmware. The control system 114 may include a desktop computer, laptop computer, computer server, programmable logic controller (PLC), distributed computing system (DSC), controllers, actuators, control cards, an instrument or analyzer, and a user interface. In operation, the control system 114 may facilitate processes at the well site 100 and including to direct operation of aspects of the hydraulic fracturing system.

The control system 114 may be communicatively coupled to a remote computing system that performs calculations and provides direction. The control system 114 may receive user input or remote-computer input that specifies the set points of the control device 118 or other control components in the hydraulic fracturing system. The control system 114 may specify the set point of the control device 118 for the component 116 addition. In some implementations, the control system 114 may calculate or otherwise determine the set point of the control device 118. The determination may be based at least in part on the operating conditions of the hydraulic fracturing and on information (or feedback) regarding wellbore pressure or amount downhole foaming.

Energized fracturing fluids in hydraulic fracturing may be beneficial for low-pressure reservoirs to enhance subsequent flowback of the fracturing fluid. Energized fracturing fluid in hydraulic fracturing may reduce or minimize damage to the subterranean formation, and thus increase the subsequent production of hydrocarbon from the subterranean formation. Embodiments herein are directed to treatment including fracturing hydrocarbon-bearing formations with self-energized fluids that self-energize in a sense of generating nitrogen in-situ for energizing the treatment fluid (fracturing fluid). The treatment fluid may not be self-energizing in a sense of relying on external factors, such as temperature of the formation (and/or a chemical activator applied in a post-flush) for the nitrogen-generating reaction to be activated or triggered. The treatment fluid (for stimulation such as hydraulic fracturing), as discussed, may include nitrogen-generating compounds (e.g., sodium nitrite, ammonium chloride, etc.), guar, surfactants, foaming agents, polymers stabilizers, crosslinkers, clay stabilizers, corrosion inhibitors, and scavengers (e.g., oxygen scavenger). One or more compounds can be incorporated in the treatment fluid and utilized as nitrogen-generating chemicals. Nanomaterial, such as silicon dioxide or silica nanoparticles (e.g., diameter less than 100 microns) can be included in the treatment fluid or fracturing fluid (frac fluid) to improve (increase) foam stability. In operation, utilization of the present fracturing fluid may expedite well flowback (and accelerate flowback time) without the need for conventional nitrogen lifting. Employment of the present fracturing fluid may reduce or minimize fracturing fluid leak-off into the formation, and therefore reduce or minimize formation damage. Embodiments of the present fracturing fluid disclosed herein may have sufficient viscosity to carry proppant, and can reservoir (subterranean formation) temperatures up to 300° F. A post-flush with acidic fluid can also be pumped to further activate the self-energized fluid and generate more nitrogen gas to accelerate flowback.

Figure 2:
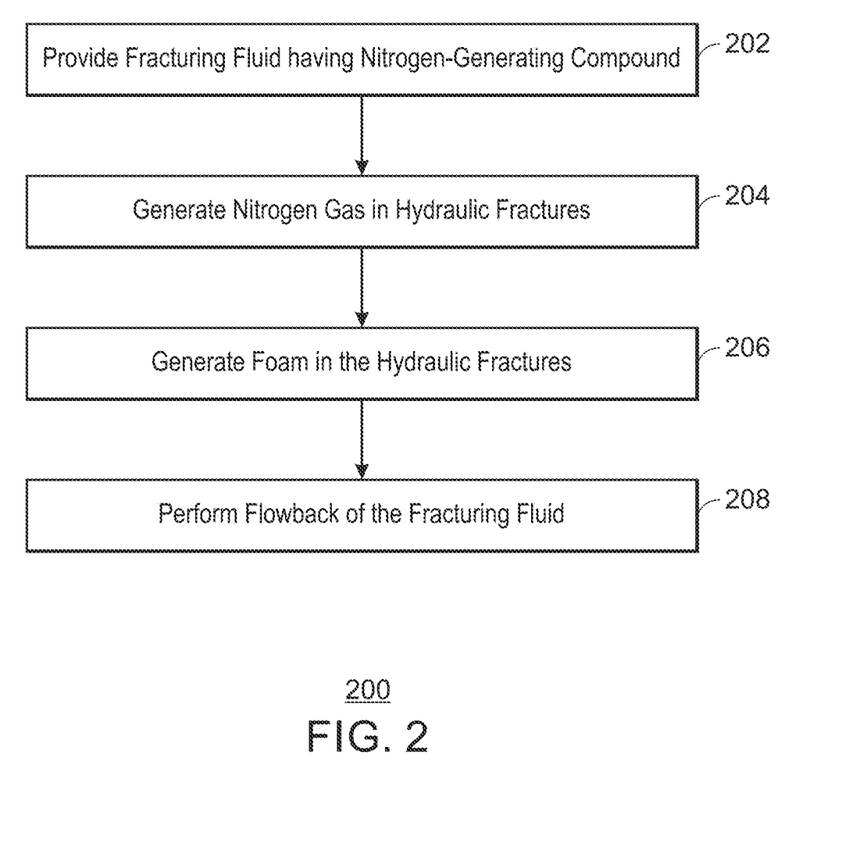
FIG. 2 is a block flow diagram of a method of hydraulic fracturing.

FIG. 2 is a method 200 of hydraulic fracturing. The hydraulic fracturing may be performed at a well site having a wellbore formed through the Earth surface in a subterranean formation in the Earth crust. The subterranean formation can be an unconventional formation in which hydraulic fracturing advances hydrocarbon production from the subterranean formation.

At block 202, the method includes providing (e.g., introducing, injecting, pumping, etc.) a fracturing fluid having a nitrite-containing compound (e.g., sodium nitrite or potassium nitrite, or both) as a nitrogen-generating compound through a wellbore into a subterranean formation to hydraulically fracture the subterranean formation, thereby forming hydraulic fractures in the subterranean formation. The method may include hydraulically fracturing the subterranean formation with the fracturing fluid to generate fractures in the subterranean formation. In particular, the method may include pumping the fracturing fluid having the nitrite-containing compound through the wellbore into the subterranean formation, thereby hydraulically fracturing the subterranean formation via the fracturing fluid and generating hydraulic fractures in the subterranean formation. In implementations, the nitrite-containing compound is not encapsulated. Any additional nitrogen-generating compounds (e.g., ammonium-containing compounds) in the fracturing fluid are typically not encapsulated. Moreover, in implementations, foam is not added to (nor generated in) the fracturing fluid at the Earth surface prior to introduction of the fracturing fluid into the wellbore. In implementations, nitrogen gas is not added to the fracturing fluid at the Earth surface prior to introduction of the fracturing fluid into the wellbore, foam is not added to the fracturing fluid at the Earth surface prior to the introduction of the fracturing fluid into the wellbore, and foam is not generated in the fracturing fluid at the Earth surface prior to introduction of the fracturing fluid into the wellbore.

At block 204, the method includes generating (forming) nitrogen gas in the hydraulic fractures via the nitrite-containing compound. The generating of the nitrogen gas or presence of the generated nitrogen gas may energize the fracturing fluid, and provide for generating foam (see block 206). In some implementations, generating (forming) the nitrogen does not rely on an ammonium-containing compound. Thus, the generating of the nitrogen may not involve a reaction of the nitrite-containing compound with an ammonium-containing compound. In certain implementations, the generating of the nitrogen gas involves decomposition or dissociation of the nitrite-containing compound and does not involve reaction of the nitrite-containing compound with an ammonium-containing compound. The generating of the nitrogen gas may be by decomposition or dissociation of the nitrite-containing compound due to temperature of the subterranean formation (or via an acid).

In implementations, the fracturing fluid includes an ammonium-containing compound. As discussed, the ammonium-containing compound may be ammonium hydroxide, ammonium chloride, ammonium bromide, ammonium nitrate, ammonium nitrite, ammonium sulfate, ammonium carbonate, or ammonium hydroxide, or any combinations thereof. The generating of the nitrogen gas may be by reaction (e.g., thermochemical reaction) of the nitrite-containing compound with the ammonium-containing compound thereby generating the nitrogen gas. In implementations, this reaction may be activated by temperature of the subterranean formation or by an acid, or a combination thereof. Thus, forming the nitrogen gas via the nitrite-containing compound may be by generating the nitrogen gas via a thermochemical reaction of the ammonium-containing compound with the nitrite-containing compound, and wherein the thermochemical reaction is activated by temperature of the subterranean formation or by an acid, or both. In implementations, the reaction may be activated by temperature (heat) of the subterranean formation and not by an acid. In implementations, the reaction may be activated by temperature of the subterranean formation and further promoted (activated) by an acid. In implementations, the reaction is not activated (triggered) by temperature of the formation but is activated by an acid.

For an acid (e.g., hydrochloric acid, acetic acid, citric acid, etc.) as a chemical activator of this reaction (e.g., thermochemical reaction) of the nitrite-containing compound with the ammonium-containing compound, the acid may be included in the fracturing fluid or applied in a post-flush. For instances with acid as an activator included in the fracturing fluid, the reaction can be triggered while the fracturing fluid is being pumped flowing through the wellbore and therefore hydrostatic pressure may be lowered placing more demand on the pump(s) for the squeeze. In contrast, activator acid included in a post-flush (not having the thermochemicals) does not trigger the reaction until reaching the thermochemcials (nitrite-containing compound and ammonium-containing compound) in the hydraulic fractures. The post-flush may be implemented after (post) the hydraulic fracturing but before or during flowback of the fracturing fluid. In implementations, an acid for activating the reaction to generate nitrogen gas is not added to the fracturing fluid at the Earth surface prior to, nor during, introduction of the fracturing fluid into the wellbore. The method may include forming nitrogen gas via the nitrite-containing compound in the fracturing fluid in the hydraulic fractures, thereby energizing the fracturing fluid with the nitrogen gas to give the fracturing fluid as an energized fracturing fluid to promote flowback (see block 208 for flowback).

At block 206, the method includes generating foam in the hydraulic fractures from the nitrogen gas and the fracturing fluid. With the generating (block 204) of the nitrogen gas via the nitrite-containing compound in the fractures, the nitrogen gas foams the fracturing fluid, and wherein the nitrogen gas foaming the fracturing fluid may advance flowback of the fracturing fluid from the fractures through the wellbore to the Earth surface.

At block 208, the method includes performing flowback of the fracturing fluid from the hydraulic fractures through the wellbore to Earth surface, wherein generating (block 204) the nitrogen facilitates the flowback. The generating of the nitrogen may facilitate (promote, advance) the flowback by generating pressure (downhole) as a motive force for the flowback or by providing for the generating (block 206) of the foam, or a combination thereof. The foam generated may beneficially lower hydrostatic pressure of the flowback to facilitate the flowback. Performing flowback may involve allowing the fracturing fluid to flow as flowback from the subterranean formation through the wellbore to the Earth surface. The method may include allowing the flowback of the fracturing fluid as energized fracturing fluid from the hydraulic fractures through the wellbore to Earth surface. The performing of the flowback may include performing the flowback of the fracturing fluid from the hydraulic fractures through the wellbore to the Earth surface via pressure of the subterranean formation as a motive force for the flowback. The method may include relying on pressure of the subterranean formation for flowback of the fracturing fluid from the fractures through the wellbore to Earth surface.

Motive force for the flowback may be at least one of pressure of the subterranean formation or pressure generated by the forming (block 204) of the nitrogen gas. In implementations, nitrogen gas is not added to the fracturing fluid at the Earth surface prior to introduction of the fracturing fluid into the wellbore. In implementations, foam is not added to (nor generated in) the fracturing fluid at the Earth surface prior to introduction of the fracturing fluid into the wellbore.

For embodiments with the reaction (e.g., thermochemical reaction) of the nitrite-containing compound (e.g., a thermochemical reagent) and the ammonium-containing compound (e.g., a thermochemical reagent) to generate (block 204) the nitrogen gas, a post-flush having acid to activate the reaction may be implemented (performed, applied). Again, the nitrite-containing compound (or reaction of the nitrite-containing compound) can be activated without presence of an ammonium-containing compound.

In embodiments, the post-flush having acid may be implemented in response to (or in view of) the pH of the fracturing fluid being greater than 11. In implementations, the pH being greater than 11 (e.g., in the range of 11 to 13) may preclude activation of the reaction by formation temperature. The method at block 204 may include performing a post-flush having an acid for activating the reaction, thereby activating the reaction with the acid, wherein pH of the fracturing fluid may be greater than 11. In implementations, a post-flush having acid (for reaction activation) is not performed, and wherein pH of the fracturing fluid may be less than 11. In implementations, activation (triggering) of the reaction by formation temperature may occur for the reaction to proceed and generate (block 204) nitrogen gas. In implementations, pH of the fracturing fluid is less than 11, temperature of the subterranean formation activates the reaction, and a post-flush having acid is not performed.

Figure 3:
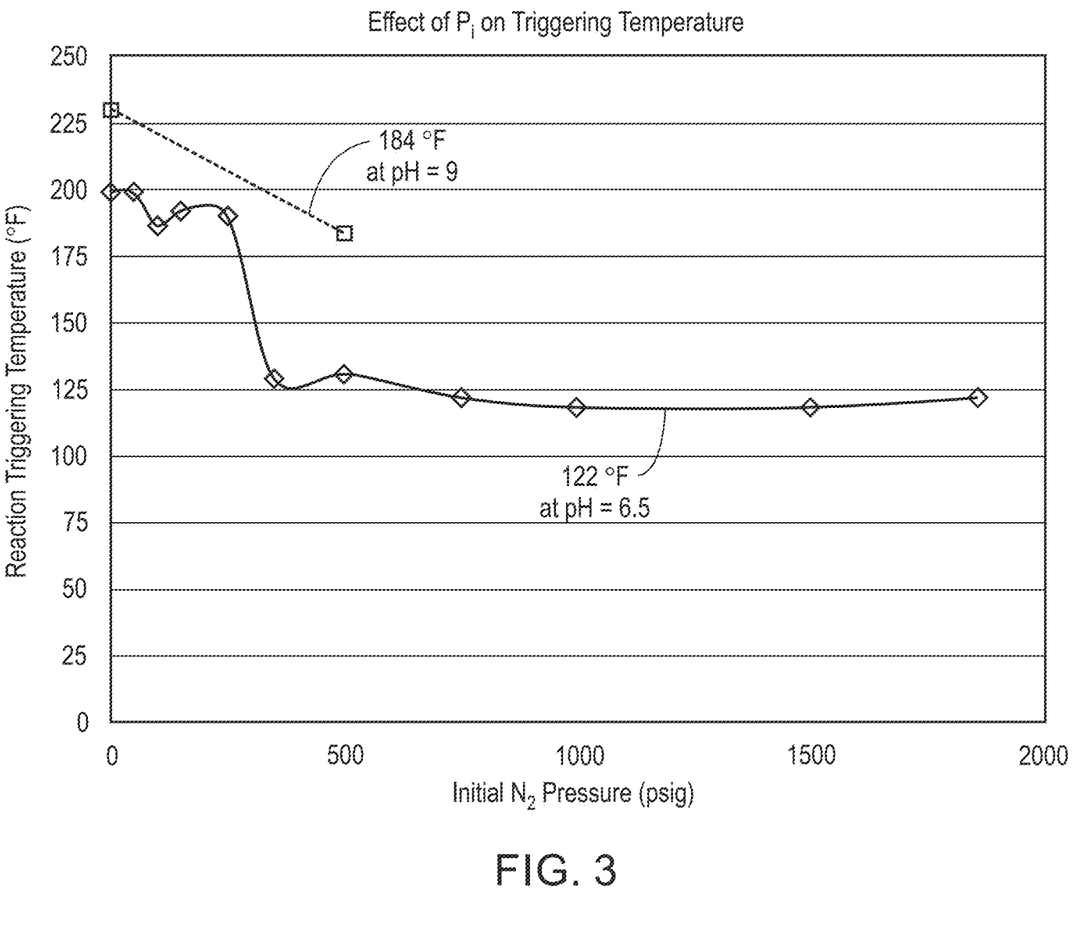
FIG. 3 is a plot of the triggering (activating) temperature of reaction of sodium nitrite in fracturing fluid to generate nitrogen gas versus pressure of the fracturing fluid for an implementation.

FIG. 3 is a plot of the triggering (activating) temperature (° F.) of reaction of sodium nitrite in fracturing fluid to generate nitrogen gas versus pressure of the fracturing fluid for an implementation. The pressure is pounds per square inch gauge (psig). Two curves are depicted for data points plotted. One curve is the fracturing fluid having a pH of 9. The other curve is the fracturing fluid having a pH of 6.5. FIG. 3 illustrates the reaction triggering temperature as a function initial pressure and pH.

In application, as the pressure on the Earth surface is low, the triggering temperature is above 200° F. for this implementation. Thus, the reaction will generally not take place at surface. However, as the fracturing fluid travels downhole, pressure and temperature increase. The triggering temperature decreases with increasing pressure.

FIG. 4 is a plot of the triggering (activating) temperature (° F.) of reaction of sodium nitrite in fracturing fluid to generate nitrogen gas versus pH of the fracturing fluid for an implementation. FIG. 4 illustrates how the reaction triggering temperature is a function of fluid pH for this implementation. The data was collected at initial pressure of 500 psig. The peak triggering temperature is at approximately 327° F. at a pH of about 9.95. The triggering temperature increased with increase in pH until reaching the peak. At pH of 11, there was no reaction up to 500° F.

Figure 5:
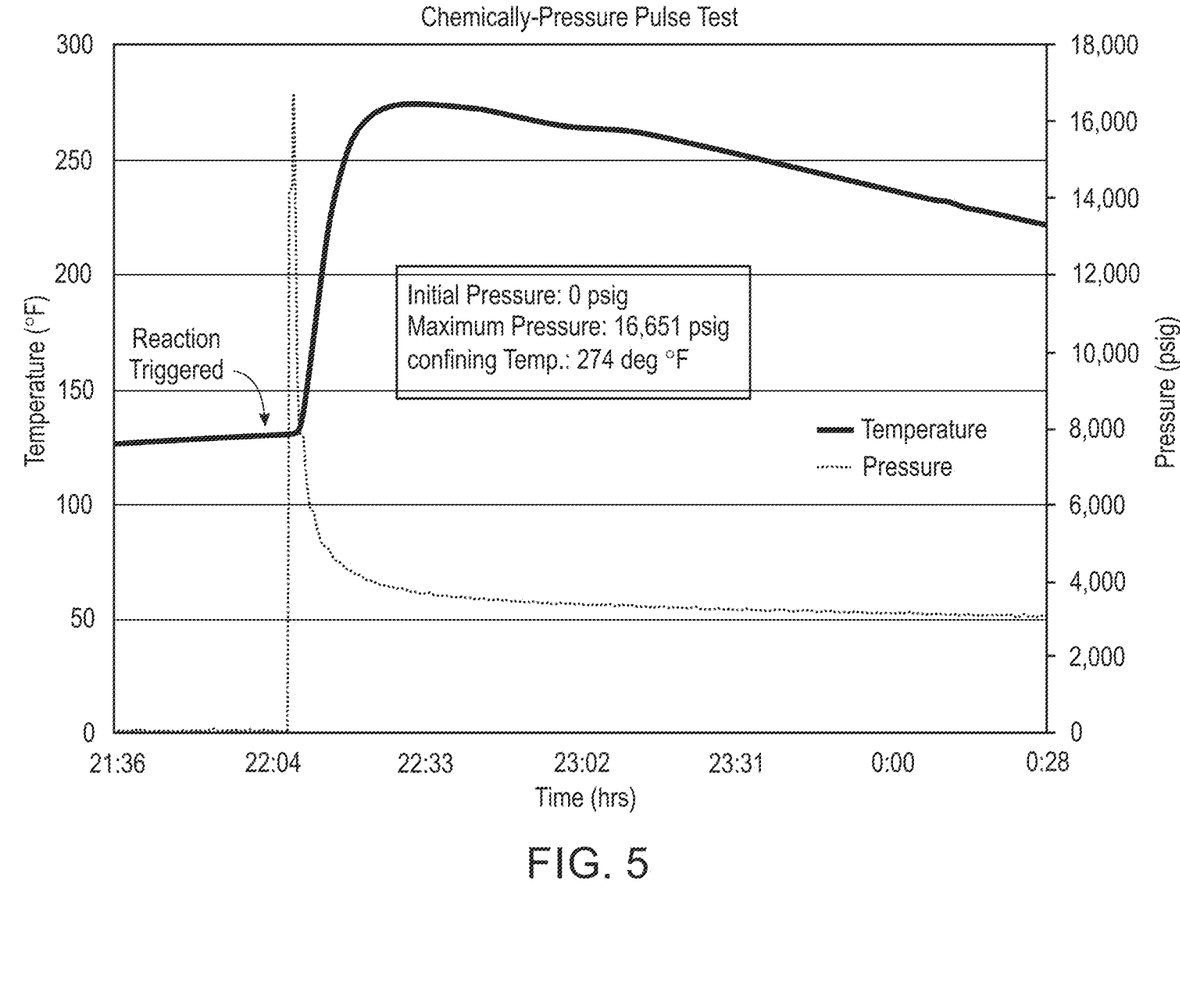
FIG. 5 is a plot of temperature and pressure over time for an implementation of a chemical-pressure pulse test.

FIG. 5 is a plot of temperature (° F.) and pressure (psig) over time (clock hours) for an implementation of a chemical-pressure pulse test. The fracturing fluid utilized for the pulse test had sodium nitrite as a nitrogen-generating compound. As can be seen, at the time the reaction of the sodium nitrite was triggered (activated) generating nitrogen case, the pressure increased. Thus, with this generation of a relatively significant amount of nitrogen gas, the pressure increase due to the nitrogen generation adds to reservoir pressure to promote flowback. The reaction of the sodium nitrite forming nitrogen gas can generate up to 20,000 psig, as measured in the laboratory. Pressure increase, due to this reaction, was observed during actual field application of 800 psi increase in the wellhead pressure.

EXAMPLE

A fracturing fluid having sodium nitrite as a nitrogen-generating compound was prepared in the laboratory. The activating or triggering of the sodium nitrite (or triggering/activation of the reaction of the sodium nitrite) to generate nitrogen gas may be by temperature (heat) and/or acid (e.g., acetic acid, citric acid, or hydrochloric acid).

Figure 6:
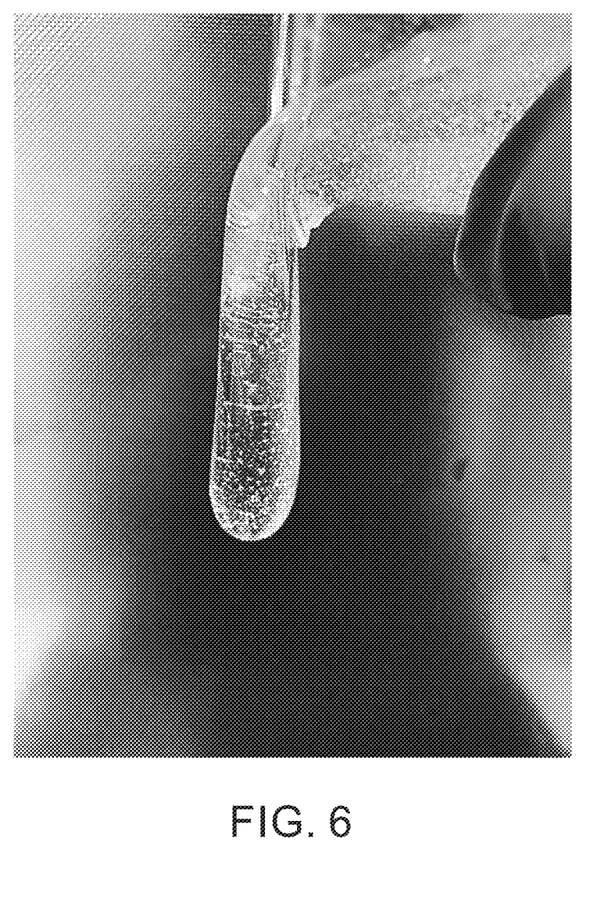
FIG. 6 is an image of a sample of pre-activated fracturing fluid in a lip test in the Example.
Figure 7:
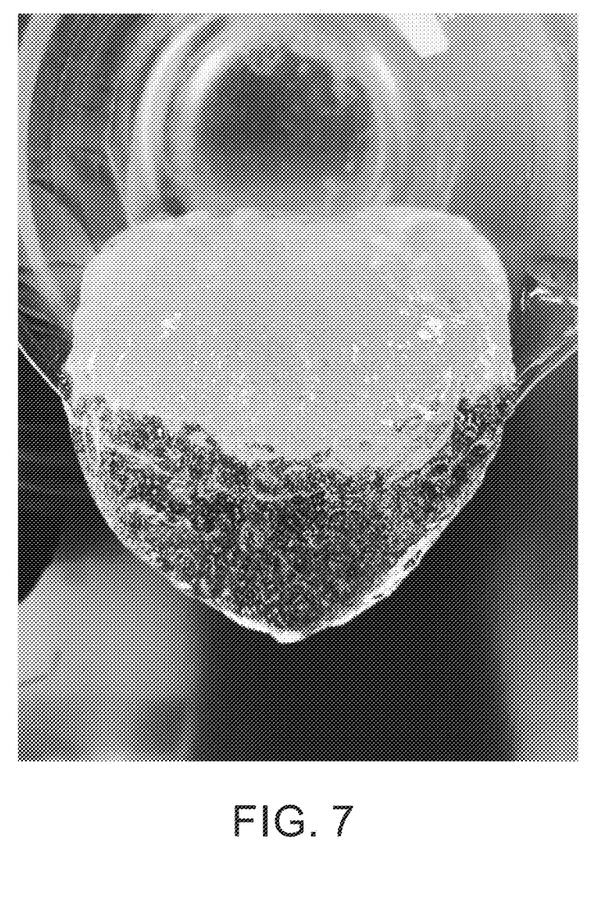
FIG. 7 is an image of conventional fracturing fluid without a nitrogen-generating component.

FIG. 6 depicts a sample of the fracturing fluid (pre-activated) in a lip test. A lip test may inform about the extent of crosslinking or viscosity, among other properties or indicators. The fracturing fluid is depicted as before activation of the reaction of the sodium nitrite to generate nitrogen gas. This may be analogous to the fracturing fluid in the field as prepared at surface prior and introduced into the wellbore. As can be seen from the image (photo), foam is not yet created. Thus, may be practical to pump the fracturing fluid from surface and squeeze into the formation, and in which the hydrostatic pressure of the fracturing fluid in the wellbore may be greater than the hydrostatic pressure of the fracturing fluid if foamed at the surface (such as with the addition of nitrogen gas at surface). This example of the present fracturing fluid is visually similar in appearance to the conventional fracturing fluid (without a nitrogen-generating component) depicted in FIG. 7.

Figure 8:
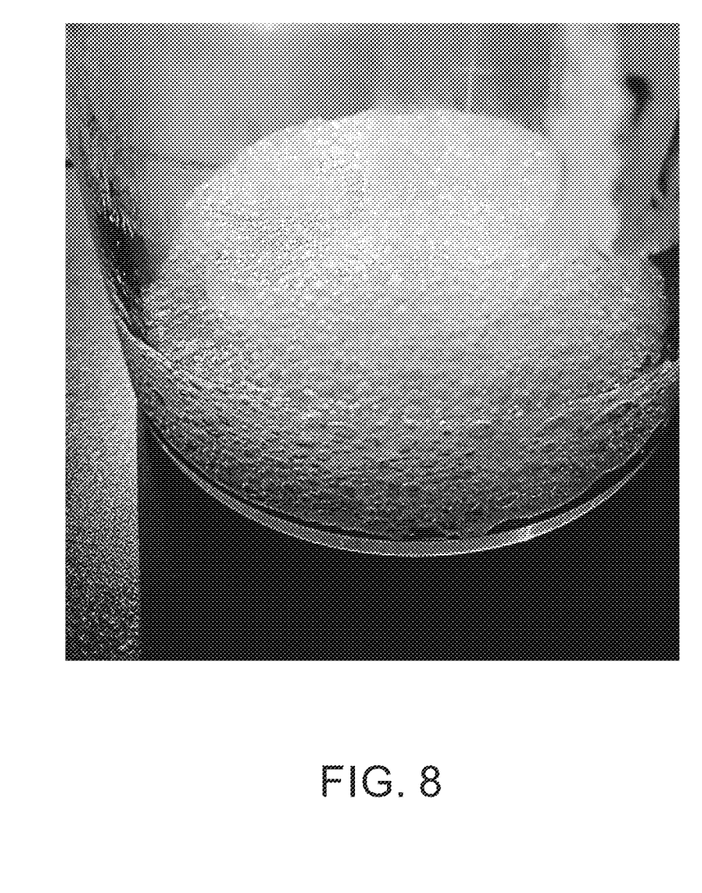
FIG. 8 is an image of a partially activated sample of the fracturing fluid with sodium nitrite prepared in the laboratory in the Example.

FIG. 8 depicts a partially-activated sample of the fracturing fluid with sodium nitrite prepared in the laboratory in the Example. The sample depicted is partially activated or limited activated at room temperature. The reaction of the nitrite-containing compound has experienced limited activation due to room temperature. Nitrogen gas (bubbles) is present in the depicted sample. The activation temperature can be increased by increasing pH of the fracturing fluid.

Figure 9:
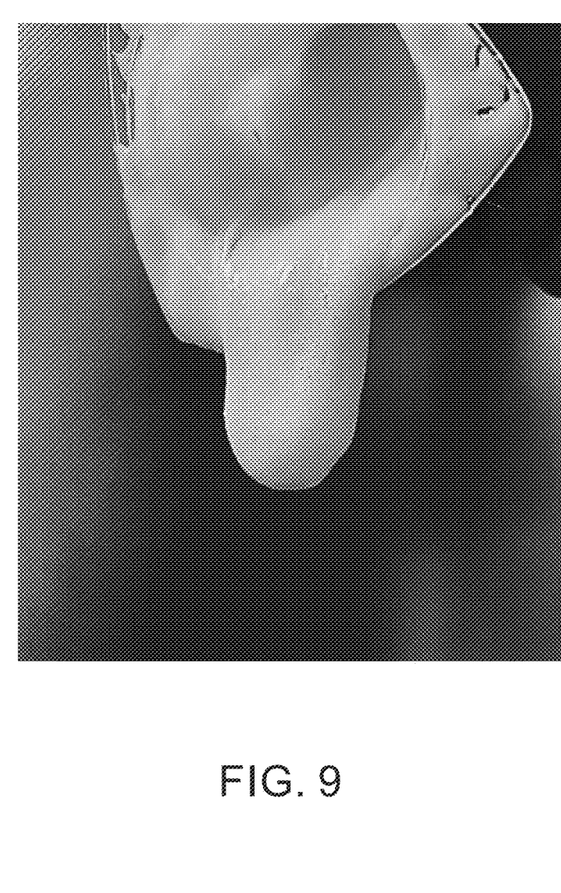
FIG. 9 is an activated sample of the fracturing fluid with sodium nitrite prepared in the laboratory in the Example.

FIG. 9 is an activated sample of the fracturing fluid with sodium nitrite prepared in the laboratory in the Example. Foam is created. The reaction of the sodium nitrite to generate nitrogen gas was activated by increasing the temperature of the sample to 100° F. Thus, in implementation in the field, the reaction can be activated by downhole temperature and the foamed fluid generated in-situ. This may avoid the need for a gas surface on surface and mixing challenges of gas with gel to prepare surface foam. For the activated sample at 100° F. in FIG. 9, the fluid viscosity approximately remained as the same fluid viscosity of the original pre-activated sample of FIG. 6. Therefore, in application, the foamed fracturing fluid may carry proppant in the fractures into the formation. The viscosity was measure at 150° F. and 100 (l/s) shear rate. The viscosity was stable approximately 800 centipoise (cP) at 150° F. Thus, when the solution is activated and foam is generated, the fluid has viscosity adequate to carry proppant in the fractures. An advantage is the fluid viscosity can generally withstand reservoir temperatures up to 300° F. The viscosity was measured at 300° F. and 100 (l/s) shear rate. The fluid viscosity was stable approximately 400 cP at 300° F. In contrast, conventional non-foamed gel-based fracturing fluids can lose viscosity at elevated temperatures, and therefore unfortunately result in screenouts and improper placement of proppant.

This Example did not include an ammonium-containing compound as nitrogen-generating compound in the fracturing. However, the thermochemical reaction of sodium nitrite with ammonium chloride in a fluid has been confirmed to generate nitrogen gas. These nitrogen-generating compounds generate nitrogen gas when activated, such as by heat or acids. See the above depicted thermochemical reaction equation of ammonium chloride and sodium nitrite.

A number of implementations have been described. Nevertheless, it will be understood that various modifications may be made without departing from the spirit and scope of the disclosure.

What is claimed is:

1. A method of hydraulic fracturing, comprising:
providing a fracturing fluid comprising a nitrite-containing compound through a wellbore into a subterranean formation to hydraulically fracture the subterranean formation, thereby forming hydraulic fractures in the subterranean formation;
generating nitrogen gas in the hydraulic fractures via the nitrite-containing compound, wherein generating the nitrogen does not rely on an ammonium-containing compound;
generating foam in the hydraulic fractures from the nitrogen gas and the fracturing fluid; and
performing flowback of the fracturing fluid from the hydraulic fractures through the wellbore to Earth surface, wherein generating the nitrogen facilitates the flowback, wherein performing the flowback comprises performing the flowback of the fracturing fluid from the hydraulic fractures through the wellbore to the Earth surface via pressure of the subterranean formation as a motive force for the flowback.

2. The method of claim 1, wherein pH of the fracturing fluid is less than 11, wherein a post-flush comprising acid is not performed, and wherein performing flowback comprises allowing the fracturing fluid to flow as flowback from the subterranean formation through the wellbore to the Earth surface.

3. The method of claim 1, wherein the nitrite-containing compound is not encapsulated, wherein the nitrite-containing compound comprises sodium nitrite or potassium nitrite, or both, and wherein generating nitrogen facilitates the flowback by generating pressure as a motive force for the flowback or by providing for the generating of the foam, or a combination thereof.

4. The method of claim 1, wherein generating the nitrogen facilitates the flowback by providing for the generating of the foam, and wherein generating the foam lowers hydrostatic pressure of the flowback.

5. The method of claim 1, comprising performing a post-flush comprising an acid, wherein pH of the fracturing fluid is greater than 11.

6. The method of claim 1, wherein the nitrite-containing compound and the ammonium-containing compound are not encapsulated, wherein pH of the fracturing fluid is less than 11, wherein a post-flush comprising acid is not performed.

7. The method of claim 1, wherein foam is not added to nor generated in the fracturing fluid at the Earth surface prior to introduction of the fracturing fluid into the wellbore.

8. The method of claim 1, wherein nitrogen gas is not added to the fracturing fluid at the Earth surface prior to introduction of the fracturing fluid into the wellbore, wherein foam is not added to the fracturing fluid at the Earth surface prior to the introduction of the fracturing fluid into the wellbore, and wherein foam is not generated in the fracturing fluid at Earth surface prior to introduction of the fracturing fluid into the wellbore.

9. A method of hydraulic fracturing, comprising:
providing a fracturing fluid comprising a nitrite-containing compound through a wellbore into a subterranean formation to hydraulically fracture the subterranean formation, thereby forming hydraulic fractures in the subterranean formation;
generating nitrogen gas in the hydraulic fractures via the nitrite-containing compound, wherein generating the nitrogen gas comprises decomposition or dissociation of the nitrite-containing compound due to temperature of the subterranean formation, and wherein generating the nitrogen does not involve a reaction of the nitrite-containing compound with an ammonium-containing compound;
generating foam in the hydraulic fractures from the nitrogen gas and the fracturing fluid; and
performing flowback of the fracturing fluid from the hydraulic fractures through the wellbore to Earth surface, wherein generating the nitrogen facilitates the flowback.

10. A method of hydraulic fracturing, comprising:
injecting a fracturing fluid comprising a nitrite-containing compound through a wellbore into a subterranean formation, wherein the nitrite-containing compound is not encapsulated;
hydraulically fracturing the subterranean formation with the fracturing fluid to generate fractures in the subterranean formation;
generating nitrogen gas via the nitrite-containing compound in the fractures, wherein the nitrogen gas foams the fracturing fluid, wherein the nitrogen gas foaming the fracturing fluid advances flowback of the fracturing fluid from the fractures through the wellbore to Earth surface, wherein generating the nitrogen gas comprises decomposition or dissociation of the nitrite-containing compound and does not involve reaction of the nitrite-containing compound with an ammonium-containing compound, and wherein the nitrite-containing compound comprises sodium nitrite or potassium nitrite, or both; and
relying on pressure of the subterranean formation for flowback of the fracturing fluid from the fractures through the wellbore to Earth surface.

11. The method of claim 10, wherein nitrogen gas is not added to the fracturing fluid at the Earth surface prior to introduction of the fracturing fluid into the wellbore, and wherein foam is not added to nor generated in the fracturing fluid at the Earth surface prior to introduction of the fracturing fluid into the wellbore.

12. A method of hydraulic fracturing, comprising:
pumping a fracturing fluid comprising a nitrite-containing compound through a wellbore into a subterranean formation, thereby hydraulically fracturing the subterranean formation via the fracturing fluid and generating hydraulic fractures in the subterranean formation;
forming nitrogen gas via the nitrite-containing compound in the fracturing fluid in the hydraulic fracture, thereby energizing the fracturing fluid with the nitrogen gas to give the fracturing fluid as an energized fracturing fluid to promote flowback, wherein forming the nitrogen gas does not involve an ammonium-containing compound, and wherein the nitrite-containing compound comprises sodium nitrite or potassium nitrite, or both; and
allowing the flowback of the energized fracturing fluid from the hydraulic fractures through the wellbore to Earth surface.

13. The method of claim 12, wherein motive force for the flowback is at least one of pressure of the subterranean formation or pressure generated by the forming of the nitrogen gas, wherein nitrogen gas is not added to the fracturing fluid at the Earth surface prior to introduction of the fracturing fluid into the wellbore, and wherein foam is not added to nor generated in the fracturing fluid at the Earth surface prior to introduction of the fracturing fluid into the wellbore.

* * * * *